United States Patent
Sasada

(10) Patent No.: US 6,563,943 B1
(45) Date of Patent: May 13, 2003

(54) CONNECTION PROCESSING METHOD FOR RADIATION IMAGES

(75) Inventor: Ryoji Sasada, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/531,169

(22) Filed: Mar. 21, 2000

(30) Foreign Application Priority Data

Mar. 23, 1999 (JP) .......................................... 11-078562
Nov. 5, 1999 (JP) .......................................... 11-315438

(51) Int. Cl.$^7$ ................................................. G06K 9/00
(52) U.S. Cl. ..................................................... 382/132
(58) Field of Search ...................... 382/132; 250/484.3; 378/62, 165, 174

(56) References Cited

U.S. PATENT DOCUMENTS

| | | | |
|---|---|---|---|
| 5,111,045 A | 5/1992 | Konno et al. ................ | 250/589 |
| 5,986,279 A | * 11/1999 | Dewaele ..................... | 250/582 |
| 6,269,177 B1 | * 7/2001 | Dewaele et al. ............ | 382/131 |

FOREIGN PATENT DOCUMENTS

| | | | |
|---|---|---|---|
| JP | 3-287248 | 12/1991 | ........... G03B/42/02 |
| JP | 3-287249 | 12/1991 | ........... G03B/42/02 |
| JP | 10-268451 | 10/1998 | ........... G03B/42/02 |

* cited by examiner

*Primary Examiner*—Andrew W. Johns
*Assistant Examiner*—Shervin Nakhjavan
(74) *Attorney, Agent, or Firm*—Sughrue Mion, PLLC

(57) ABSTRACT

A radiation image of an object is recorded on stimulable phosphor sheets associated with one another such that portions of two adjacent sheets overlap each other. Connection processing is performed on radiation images read out from the sheets in order to reconstruct the radiation image of the object. In the connection processing, as for at least a certain area within overlapping regions of the two radiation images read out from the two adjacent sheets, an area within the overlapping region of a first radiation image read out from a first sheet remote from the object is employed. Image density correction is made such that the image density of the area within the overlapping region of the first radiation image, which area is employed as at least the certain area, approximately coincides with the image density of a non-overlapping region of the first radiation image and/or the image density of a second radiation image read out from a second sheet close to the object.

10 Claims, 9 Drawing Sheets

F I G . 2
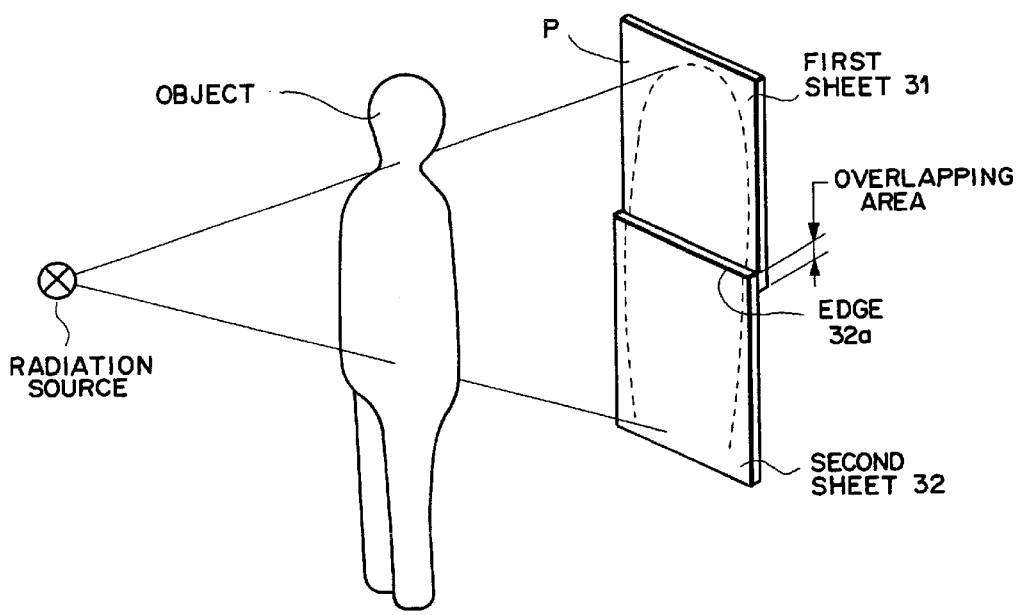

F I G. 7
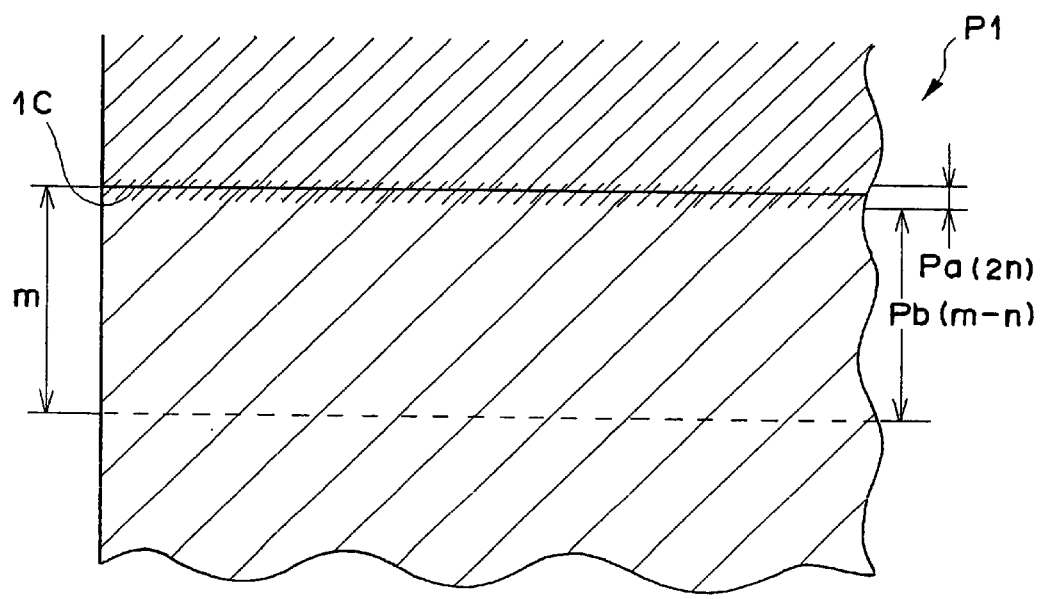

CONNECTION PROCESSING METHOD FOR RADIATION IMAGES

BACKGROUND OF THE INVENTION

1. Field of the Invention

This invention relates to a connection processing method for radiation images and a radiation image processing apparatus for carrying out the method. This invention particularly relates to connection processing for radiation images, which is performed in cases where a radiation image of an object having been recorded on a plurality of stimulable phosphor sheets associated with one another is to be reconstructed.

2. Description of the Prior Art

Recently, as systems capable of obtaining radiation images recorded even when energy intensity of radiation, to which a recording medium is exposed, varies over a wide range, computed radiography systems (CR systems) have widely been used in practice. With the CR systems, a radiation image of an object, such as a human body, is recorded on a stimulable phosphor sheet. The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an image signal. The image signal is then processed and used for the reproduction of the radiation image of the object as a visible image on a recording material.

In the CR systems, stimulable phosphor sheets having various different sizes, such as a 14"×17" size, a 14"×14" size, a 10"×12" size, and a 8"×10" size, have heretofore been used in accordance with the objects whose images are to be recorded. However, in the fields of the orthopedic surgery, for the purposes of measuring the degree of bending of the spinal column, and the like, there is a strong demand for the use of a long image ranging from a pattern of the neck to a pattern of the waist as a single image. Therefore, it has been studied to utilize stimulable phosphor sheets which are longer than the aforesaid sizes in a predetermined direction.

However, in cases where the long stimulable phosphor sheets are utilized, designs of radiation image read-out apparatuses for reading out the radiation images from the stimulable phosphor sheets, such as the designs of sheet conveyance paths in the radiation image read-out apparatuses, must be altered markedly so as to be adapted to the long stimulable phosphor sheets. The radiation image read-out apparatuses must thus be designed for the exclusive use for the long stimulable phosphor sheets. Therefore, the problems occur in that the radiation image read-out apparatuses designed for the long stimulable phosphor sheets are disadvantageous in the aspect of cost.

Accordingly, a technique may be utilized, wherein two stimulable phosphor sheets having the conventional sizes are associated with each other to form an apparently long stimulable phosphor sheet, a long image is recorded on the apparently long stimulable phosphor sheet, and thereafter the two stimulable phosphor sheets constituting the apparently long stimulable phosphor sheet are subjected to image read-out operations one after the other. With the technique, the image read-out to operations can be performed by utilizing the conventional radiation image read-out apparatus without its design being altered, and the problems described above do not occur.

Also, with the technique described above, three or more stimulable phosphor sheets can be associated with one another to form an apparently long stimulable phosphor sheet, and a long image of an object can be recorded on the apparently long stimulable phosphor sheet. Also, a plurality of stimulable phosphor sheets can be associated with one another in two axis directions, which are normal to each other, in order to form an apparently wide, long stimulable phosphor sheet, and a wide, long image of an object can be recorded on the apparently wide, long stimulable phosphor sheet. Therefore, the technique described above has good adaptability to objects.

In cases where at least two stimulable phosphor sheets are associated with each other to form an apparently long stimulable phosphor sheet and an image of an object is recorded on the apparently long stimulable phosphor sheet, if the two adjacent stimulable phosphor sheets among the plurality of the stimulable phosphor sheets are considered, the two adjacent stimulable phosphor sheets may be associated with each other such that their edges are in abutment with each other. Alternatively, the two adjacent stimulable phosphor sheets may be associated with each other such that portions of the two sheets overlap each other. However, with the technique wherein the two adjacent stimulable phosphor sheets are associated with each other such that their edges are in abutment with each other, loss of image information will inevitably occurs at the boundary area between the two adjacent stimulable phosphor sheets. With the technique wherein the two adjacent stimulable phosphor sheets are associated with each other such that the portions of the two sheets overlap each other, such loss of image information does not occur.

In cases where a radiation image of an object is recorded on the two adjacent stimulable phosphor sheets, which are associated with each other such that the portions of the two sheets overlap each other, and the two radiation images having been read out from the two stimulable phosphor sheets are connected with each other, as for the overlapping regions of the two radiation images, which overlapping regions correspond to the overlapping areas of the two stimulable phosphor sheets, the image information within the overlapping region of the radiation image having been read out from the stimulable phosphor sheet located on the side close to the object should preferably be employed for the reasons described below.

Specifically, in cases where radiation carrying image information of the object is irradiated to a first stimulable phosphor sheet, which is one of the two adjacent stimulable phosphor sheets associated with each other in the manner described above and which is located on the side remote from the object, and the other second stimulable phosphor sheet, which is located on the side close to the object, the overlapping area of the first stimulable phosphor sheet, upon which the overlapping area of the second stimulable phosphor sheet overlaps, is exposed to the radiation having decayed to a dose smaller than the dose of the radiation irradiated to the other area of the first stimulable phosphor sheet, which area does not overlap the second stimulable phosphor sheet. Therefore, the image density of the overlapping region of a first radiation image having been read out from the first stimulable phosphor sheet becomes lower than the image density of the non-overlapping region of the first radiation image. Accordingly, if the image information recorded within the overlapping region of the first radiation image is employed with respect to the overlapping regions of the first radiation image and a second radiation image, which has been read out from the second stimulable phosphor sheet, and a radiation image is thereby reconstructed from the first and second radiation images, a reconstructed radiation image will be obtained in which the image density of the long, narrow overlapping region is lower than the image density of the other region. As a result, a reconstructed radiation image, which has good image quality and can serve as an effective tool in, particularly, the efficient and accurate diagnosis of an illness, cannot be obtained. However, as for the second radiation image having been read out from the second stimulable phosphor sheet, the image density of the overlapping region of the second radiation image is identical with the image density of the non-overlapping region of the second radiation image. Therefore, in cases where the image information recorded within the overlapping region of the second radiation image is employed with respect to the overlapping regions of the first radiation image and the second radiation image, and a radiation image is thereby reconstructed from the first and second radiation images, the problems do not occur in that a reconstructed radiation image is obtained in which the image density of the long, narrow overlapping region is lower than the image density of the other region.

However, for reasons of constitution of a radiation image read-out apparatus for reading out a radiation image from a stimulable phosphor sheet, it often occurs that the image information recorded at an edge area of the stimulable phosphor sheet cannot be read out. In such cases, of the image information recorded within the overlapping region of the second stimulable phosphor sheet, which image information is to be employed for reconstructing a composite radiation image, the image information recorded at the unreadable edge area of the second stimulable phosphor sheet cannot be read out. Therefore, if the composite radiation image is reconstructed from the first and second radiation images having thus been read out from the first and second stimulable phosphor sheets, a composite radiation image will be obtained in which the image information corresponding to the unreadable edge area has been lost. Accordingly, as for the part of the overlapping region corresponding to the unreadable edge area, the image information, which has been read out from the corresponding part of the overlapping area of first stimulable phosphor sheet and which has a low image density must be employed.

In such cases, since the image density of the overlapping region of the first radiation image having been read out from the first stimulable phosphor sheet is lower than the image density of the other non-overlapping region of the first radiation image, the problems occur with the reconstructed radiation image in that a long, narrow area having a low image density remains within the overlapping region.

SUMMARY OF THE INVENTION

The primary object of the present invention is to provide a connection processing method for radiation images, wherein a single radiation image is reconstructed from radiation images having been read out from a plurality of stimulable phosphor sheets, which are associated with one another with portions of two adjacent stimulable phosphor sheets overlapping each other and on which the radiation images have been recorded, such that, even if image information recorded at an edge area of one of the two adjacent stimulable phosphor sheets cannot be read out and is therefore lost in the radiation image having been read out from the one stimulable phosphor sheet, an area having a low image density, which adversely affects the image quality of the reconstructed radiation image and its capability of serving as an effective tool in, particularly, the efficient and accurate diagnosis of an illness, will not be formed at part of an overlapping region of the reconstructed radiation image, which overlapping region corresponds to overlapping areas of the two adjacent stimulable phosphor sheets.

Another object of the present invention is to provide a radiation image processing apparatus for carrying out the connection processing method for radiation images.

In a connection processing method for radiation images and a radiation image processing apparatus in accordance with the present invention, in cases where at least a certain area within an overlapping region of a first radiation image having been read out from a first stimulable phosphor sheet located on the side that is remote from an object at an area at which two adjacent stimulable phosphor sheets overlap each other, is employed in image reconstruction with respect to overlapping regions of two radiation images having been read out from the two adjacent stimulable phosphor sheets, which overlapping regions correspond to overlapping areas of the two adjacent stimulable phosphor sheets, an image density correction is made such that the image density of the area of the first radiation image, which area is employed as at least the certain area within the overlapping region of the radiation image, approximately coincides with the image density of a non-overlapping region of the first radiation image other than the overlapping region and/or the image density of a second radiation image having been read out from a second stimulable phosphor sheet, which is located on the side close to the object.

Specifically, the present invention provides a connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) as for at least a certain area within overlapping regions of two radiation images having been read out from the two adjacent stimulable phosphor sheets, which overlapping regions correspond to overlapping areas of the two adjacent stimulable phosphor sheets, employing an area within the overlapping region of a first radiation image having been read out from a first stimulable phosphor sheet located on the side remote from the object, which first stimulable phosphor sheet is one of the two adjacent stimulable phosphor sheets, and ii) making an image density correction such that an image density of the area within the overlapping region of the first radiation image, which area is employed as at least the certain area within the overlapping regions of the two radiation images having been read out from the two adjacent stimulable phosphor sheets, approximately coincides with the image density of a non-overlapping region of the first radiation image other than the overlapping region and/or the image density of a second radiation image having been read out from a second stimulable phosphor sheet, which is located on the side close to the object.

The term "at least a certain area within overlapping regions of two radiation images" as used herein means, for example, the area corresponding to the unreadable edge area of the second radiation image having been recorded on the second stimulable phosphor sheet.

The term "side remote from an object" as used herein means the side remote from the object at the area at which the two adjacent stimulable phosphor sheets overlap each other.

The term "image density" as used herein means the gray level, the luminous level, and the like, in an image having gradation. The term "image density" as used herein also embraces the meaning as the luminance of an image displayed on a display device, such as a cathode ray tube (CRT) display device. In cases where the radiation image is expressed as an image signal, the term "image density" as used herein represents the image signal value.

The correction of the image density (or the luminance, or the like) may be made before the radiation image is reconstructed. Alternatively, the image density correction may be made after the radiation image has been reconstructed. In cases where the image density correction is made before the radiation image is reconstructed, the image density correction should preferably be made with respect to the entire area of the overlapping region of the first radiation image. In such cases, the processing for the image density correction can be kept simpler than when only the area of the first radiation image to be utilized for the image reconstruction is extracted and the image density correction is made with respect to the extracted area.

The image density correction may be made with one of various techniques. For example, the image density may be shifted uniformly (i.e., a predetermined image density shift value may be added to the image density to be corrected). Alternatively, the image density may be multiplied by a predetermined value (i.e., a predetermined image density shift factor). The predetermined value for the shifting and the predetermined value for the multiplication can be determined in accordance with, for example, the mean value of the image density values of the readable area of the overlapping region of the second radiation image, which was able to be read out as the image information of the overlapping region (i.e., the area of the overlapping region other than the unreadable edge area whose image information was lost in the image read-out operation), and the mean value of the image density values of the area of the first radiation image, which area corresponds to the readable area of the overlapping region of the second radiation image.

Also, as a specific technique for the image density correction, different image density correcting processes should preferably be performed for (a) a boundary-neighboring subarea, which neighbors with a boundary between the overlapping region and the non-overlapping region of the first radiation image (and contains the boundary), the boundary-neighboring subarea being located in the area within the overlapping region of the first radiation image, which area is employed as at least the certain area within the overlapping regions of the two radiation images having been read out from the two adjacent stimulable phosphor sheets, and (b) the subarea other than the boundary-neighboring subarea, the other subarea being located in the area within the overlapping region of the first radiation image, which area is employed as at least the certain area within the overlapping regions of the two radiation images having been read out from the two adjacent stimulable phosphor sheets. Specifically, the overlapping region and the non-overlapping region of the first radiation image have been recorded with different doses of radiation, and therefore a boundary line image pattern due to the difference in image density is formed at the boundary between the overlapping region and the non-overlapping region of the first radiation image. The boundary line image pattern has a low sharpness due to effects of scattering of the radiation, and the like. In such cases, if the image density correction for uniformly setting the image density at a high value is performed on the low image density side with respect to the boundary line image pattern (i.e., on the overlapping region), the image density of the area neighboring with the boundary line image pattern will become higher than the image density of the non-overlapping region, and an artifact will occur.

Therefore, with respect to the boundary-neighboring subarea, an image density correcting process different from that for the subarea other than the boundary-neighboring subarea is performed. In this manner, the artifact described above can be prevented from occurring.

Specifically, the image density correcting process for the subarea other than the boundary-neighboring subarea should preferably be performed by the addition of a predetermined image density shift value regardless of a distance from the boundary or by the multiplication of a predetermined image density shift factor regardless of the distance from the boundary, and the image density correcting process for the boundary-neighboring subarea should preferably be performed by the addition of image density shift values changing in accordance with the distance from the boundary or by the multiplication of image density shift factors changing in accordance with the distance from the boundary.

Specifically, the term "boundary-neighboring subarea" as used herein means the subarea neighboring with the boundary, which subarea has the range of the width of the boundary line image pattern having become unsharp and wide for the reasons described above or has a range slightly wider than the range of the width of the boundary line image pattern.

Further, smoothing processing (such as median filtering processing) should preferably be performed with respect to the area, which has been subjected to the image density correction, and an area in the vicinity of the area, which has been subjected to the image density correction, in the radiation image after being reconstructed as the single radiation image. In cases where the smoothing processing is thus performed, even if an image pattern of a boundary line occurs due to a slight difference in image density between the area within the overlapping region of the first radiation image, which area has been subjected to the image density correction, and the readable area of the overlapping region of the second radiation image, the image pattern of the boundary line can be suppressed. Therefore, a reconstructed radiation image can be obtained, which has good image quality and can serve as an effective tool in, particularly, the efficient and accurate diagnosis of an illness.

In order for the image information recorded within the overlapping regions to be reconstructed, it is necessary for the overlapping regions to be detected. The detection of the overlapping regions may be performed with one of various techniques.

Specifically, position matching markers formed from a material having a low radiation transmittance may be located at the overlapping areas of the two adjacent stimulable phosphor sheets, and the image recording operation may be performed in this state. Thereafter, the image patterns of the position matching markers appearing within the overlapping regions of the two radiation images may be utilized as reference image patterns for the position matching, and the matching of positions of the two radiation images with each other may thereby be performed. In this manner, the overlapping regions can be detected.

Alternatively, instead of the position matching markers being utilized, a subregion within the overlapping region of the radiation image having been read out from one of the two adjacent stimulable phosphor sheets, which subregion contains a feature image pattern, may be set as a template, and template matching may be performed for searching a subregion in the radiation image having been read out from the other stimulable phosphor sheet, which subregion coincides with the template having been set. The matching of positions of the two radiation images with each other may thus be performed. In this manner, the overlapping regions can be detected.

As another alternative, the overlapping regions may be detected with a technique for detecting the boundary line image pattern having been formed between the overlapping region and the non-overlapping region on one of the two radiation images. The technique for detecting the boundary line image pattern is simpler than the technique for performing the position matching by utilizing the markers described above and the technique for performing the position matching with the template matching. Specifically, the overlapping area of the first stimulable phosphor sheet, which is located on the side remote from the object, is exposed to the radiation having decayed to a dose smaller than the dose of the radiation irradiated to the other area of the first stimulable phosphor sheet, which does not overlap the other second stimulable phosphor sheet. Therefore, an image pattern of a boundary line due to a difference in image density is formed between the overlapping area and the non-overlapping area of the first stimulable phosphor sheet located on the side remote from the object. The boundary line image pattern may be detected with edge detection processing, or the like. Also, the matching of positions of the two radiation images with each other may be performed such that the position of the edge on the side of the overlapping region of the second radiation image, which has been read out from the second stimulable phosphor sheet located on the side close to the object, coincides with the position in the first radiation image, which position is shifted from the position of the boundary line image pattern in the first radiation image into the overlapping region (on the low image density side) of the first radiation image by the distance corresponding to the length of the unreadable edge area of the second stimulable phosphor sheet. In this manner, the overlapping regions may be detected.

In the image recording operation for recording an image of an object on a stimulable phosphor sheet, radiation is produced by a radiation source as a divergent beam and is irradiated to the object. Therefore, the size of the image of the object recorded on the first stimulable phosphor sheet located on the side remote from the object and the size of the image of the object recorded on the second stimulable phosphor sheet are slightly different from each other. The image recorded on the first stimulable phosphor sheet located on the side remote from the object is larger than the image recorded on the second stimulable phosphor sheet located on the side close to the object. Therefore, in cases where there is the risk of the difference between the sizes of the two radiation images, which are to be subjected to the connection processing, adversely affecting the image quality of the composite image after being subjected to the connection processing, image size enlargement or reduction processing may be performed on the first radiation image having been read out from the first stimulable phosphor sheet located on the side remote from the object and/or the second radiation image having been read out from the second stimulable phosphor sheet located on the side close to the object, such that the sizes of the first radiation image and the second radiation image coincide with each other.

The present invention also provides a radiation image processing apparatus for carrying out the connection processing method for radiation images in accordance with the present invention. Specifically, the present invention also provides a radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, wherein the connection processing means performs the connection processing such that, as for at least a certain area within overlapping regions of two radiation images having been read out from the two adjacent stimulable phosphor sheets, which overlapping regions correspond to overlapping areas of the two adjacent stimulable phosphor sheets, the connection processing means employs an area within the overlapping region of a first radiation image having been read out from a first stimulable phosphor sheet located on the side remote from the object, which first stimulable phosphor sheet is one of the two adjacent stimulable phosphor sheets, and the apparatus further comprises correction processing means for making an image density correction such that an image density of the area within the overlapping region of the first radiation image, which area is employed as at least the certain area within the overlapping regions of the two radiation images having been read out from the two adjacent stimulable phosphor sheets, approximately coincides with the image density of a non-overlapping region of the first radiation image other than the overlapping region and/or the image density of a second radiation image having been read out from a second stimulable phosphor sheet, which is located on the side close to the object.

The radiation image processing apparatus in accordance with the present invention should preferably further comprise smoothing processing means for performing smoothing processing (such as median filtering processing) with respect to the area, which has been subjected to the image density correction, and an area in the vicinity of the area, which has been subjected to the image density correction, in the radiation image after being reconstructed as the single radiation image.

Also, in the image recording operation for recording an image of an object on a stimulable phosphor sheet, radiation is produced by a radiation source as a divergent beam and is irradiated to the object. Therefore, the size of the image of the object recorded on the first stimulable phosphor sheet located on the side remote from the object and the size of the image of the object recorded on the second stimulable phosphor sheet are slightly different from each other. The image recorded on the first stimulable phosphor sheet located on the side remote from the object is larger than the image recorded on the second stimulable phosphor sheet located on the side close to the object. Therefore, in the radiation image processing apparatus in accordance with the present invention, in cases where there is the risk of the difference between the sizes of the two radiation images, which are to be subjected to the connection processing, adversely affecting the image quality of the composite image after being subjected to the connection processing, image size enlargement or reduction processing may be performed on the first radiation image having been read out from the first stimulable phosphor sheet located on the side remote from the object and/or the second radiation image having been read out from the second stimulable phosphor sheet located on the side close to the object, such that the sizes of the first radiation image and the second radiation image coincide with each other.

As described above, the correction processing means corrects the image density of the area within the overlapping region of the first radiation image, which area is employed as at least the certain area within the overlapping regions of the two radiation images having been read out from the two adjacent stimulable phosphor sheets. The correction processing means should preferably perform different image density correcting processes for (a) a boundary-neighboring subarea, which neighbors with a boundary between the overlapping region and the non-overlapping region of the first radiation image, the boundary-neighboring subarea being located in the area within the overlapping region of the first radiation image, which area is employed as at least the certain area within the overlapping regions of the two radiation images having been read out from the two adjacent stimulable phosphor sheets, and (b) the subarea other than the boundary-neighboring subarea, the other subarea being located in the area within the overlapping region of the first radiation image, which area is employed as at least the certain area within the overlapping regions of the two radiation images having been read out from the two adjacent stimulable to phosphor sheets.

In such cases, the correction processing means should preferably perform the image density correcting process for the subarea other than the boundary-neighboring subarea by the addition of a predetermined image density shift value regardless of a distance from the boundary or by the multiplication of a predetermined image density shift factor regardless of the distance from the boundary, and should preferably perform the image density correcting process for the boundary-neighboring subarea by the addition of image density shift values changing in accordance with the distance from the boundary or by the multiplication of image density shift factors changing in accordance with the distance from the boundary.

With the connection processing method for radiation images and the radiation image processing apparatus in accordance with the present invention, the single radiation image of the object is recorded on the plurality of the stimulable phosphor sheets associated with one another such that portions of the two adjacent stimulable phosphor sheets overlap each other, and the connection processing is performed on the plurality of the radiation images having been read out from the plurality of the stimulable phosphor sheets respectively, such that the single radiation image of the object is reconstructed from the plurality of the read-out radiation images. In the connection processing, as for at least the certain area within the overlapping regions of the two radiation images having been read out from the two adjacent stimulable phosphor sheets, which overlapping regions correspond to the overlapping areas of the two adjacent stimulable phosphor sheets, the area within the overlapping region of the first radiation image having been read out from the first stimulable phosphor sheet located on the side remote from the object, is employed. Also, the image density correction is made such that the image density of the area within the overlapping region of the first radiation image, which area is employed as at least the certain area within the overlapping regions of the two radiation images having been read out from the two adjacent stimulable phosphor sheets, approximately coincides with the image density of the non-overlapping region of the first radiation image other than the overlapping region and/or the image density of the second radiation image having been read out from the second stimulable phosphor sheet, which is located on the side close to the object. Therefore, even if the image information recorded at the edge area of the second stimulable phosphor sheet cannot be read out and is therefore lost in the second radiation image having been read out from the second stimulable phosphor sheet, the problems can be prevented from occurring in that an area having a low image density, which adversely affects the image quality of the reconstructed radiation image and its capability of serving as an effective tool in, particularly, the efficient and accurate diagnosis of an illness, is formed at part of the overlapping region of the reconstructed radiation image, which overlapping region corresponds to the overlapping areas of the two adjacent stimulable phosphor sheets.

BRIEF DESCRIPTION OF THE DRAWINGS

FIG. 2 is a perspective view showing how a single radiation image of an object is recorded on two adjacent stimulable phosphor sheets, portions of which overlap each other, FIG. 7 is an explanatory view showing the boundary line image pattern-neighboring subarea of the first radiation image and the subarea other than the boundary line image pattern-neighboring subarea of the first radiation image.

DESCRIPTION OF THE PREFERRED EMBODIMENTS

The present invention will hereinbelow be described in further detail with reference to the accompanying drawings.

Figure 1:
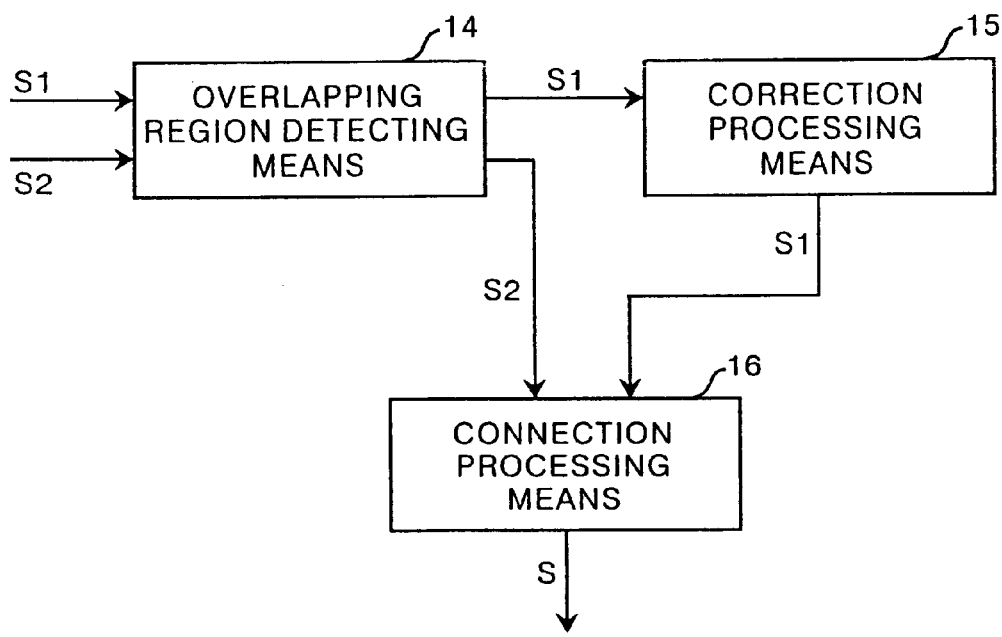
FIG. 1 is a block diagram showing an embodiment of the radiation image processing apparatus for carrying out the connection processing method for radiation images in accordance with the present invention.
Figure 3A:
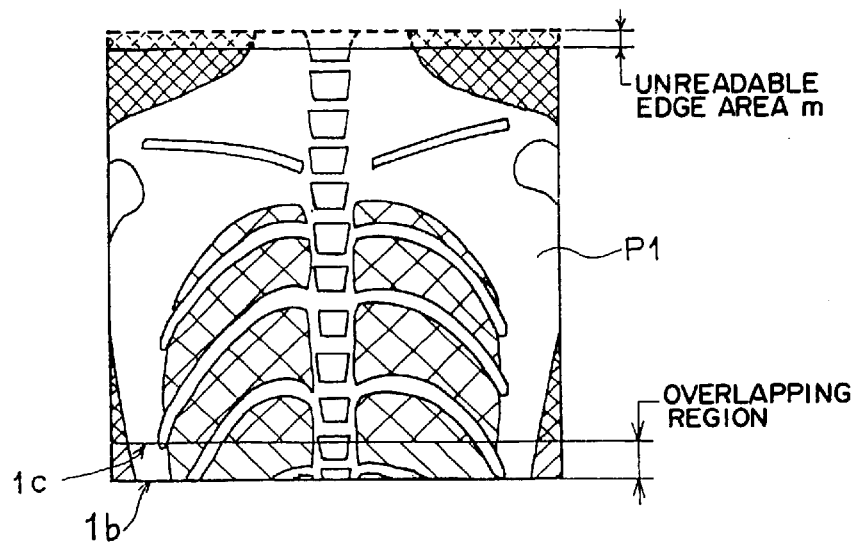
FIG. 3A is a schematic view showing a first radiation image having been read out from a first stimulable phosphor sheet, which is one of the two adjacent stimulable phosphor sheets shown in FIG. 2 and which is located on the side remote from the object.
Figure 3B:
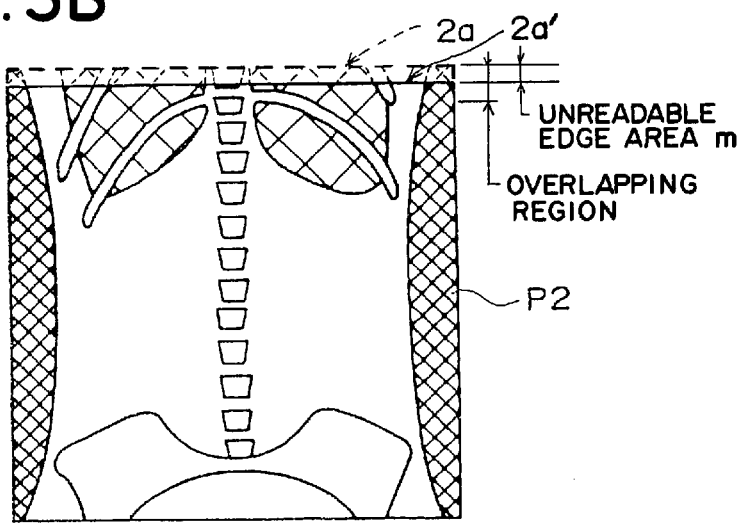
FIG. 3B is a schematic view showing a second radiation image having been read out from the other second stimulable phosphor sheet shown in FIG. 2, which is located on the side close to the object.

FIG. 1 is a block diagram showing an embodiment of the radiation image processing apparatus for carrying out the connection processing method for radiation images in accordance with the present invention. FIG. 2 is a perspective view showing how a single radiation image of an object is recorded on two adjacent stimulable phosphor sheets, portions of which overlap each other. FIG. 3A is a schematic view showing a first radiation image having been read out from a first stimulable phosphor sheet, which is one of the two adjacent stimulable phosphor sheets shown in FIG. 2 and which is located on the side remote from the object. FIG. 3B is a schematic view showing a second radiation image having been read out from the other second stimulable phosphor sheet shown in FIG. 2, which is located on the side close to the object. The first and second radiation images shown in FIGS. 3A and 3B are subjected to connection processing performed in the embodiment of FIG. 1.

Firstly, how a first radiation image P1 shown in FIG. 3A and a second radiation image P2 shown in FIG. 3B, which are to be subjected to connection processing performed by the embodiment the radiation image processing apparatus shown in FIG. 1, are obtained will be described hereinbelow.

As illustrated in FIG. 2, a single radiation image P of an object is recorded on two adjacent stimulable phosphor sheets 31 and 32 associated with one another such that portions of the stimulable phosphor sheets 31 and 32 overlap each other. The first radiation image P1 shown in FIG. 3A is read out from the first stimulable phosphor sheet 31 located on the side remote from the object, and the second radiation image P2 shown in FIG. 3B is read out from the second stimulable phosphor sheet 32 located on the side close to the object. In the image recording operation, the image information at the edge area indicated by the broken lines in FIG. 3A is also recorded on the first stimulable phosphor sheet 31. Also, the image information at the edge area indicated by the broken lines in FIG. 3B is also recorded on the second stimulable phosphor sheet 32. However, several types of radiation image read-out apparatuses for reading out a radiation image from a stimulable phosphor sheet cannot perfectly read out the image information recorded at the edge area of the first stimulable phosphor sheet 31 and the image information recorded at the edge area of the second stimulable phosphor sheet 32.

Figure 4A:
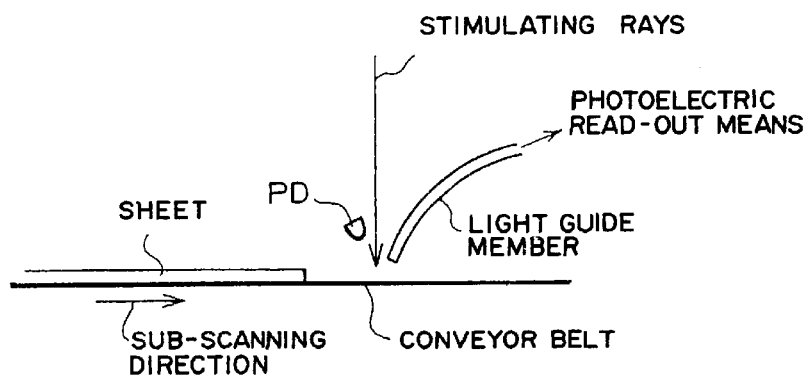
FIG. 4A is an explanatory view showing an example of how part of image information stored at an overlapping area of the second stimulable phosphor sheet is lost in an image read-out operation in cases where image information having been recorded at an edge area of the second stimulable phosphor sheet cannot be read out perfectly.

Specifically, ordinarily, a radiation image read-out apparatus comprises a stimulating ray source for producing stimulating rays, which cause a stimulable phosphor sheet to emit light in proportion to the amount of energy stored thereon during its exposure to radiation. The radiation image read-out apparatus also comprises main scanning means for repeatedly scanning the stimulable phosphor sheet, on which a radiation image has been stored, with the stimulating rays, which have been produced by the stimulating ray source, along a main scanning direction. The radiation image read-out apparatus further comprises sub-scanning means, such as a conveyor belt, for moving the stimulable phosphor sheet in a direction, which is approximately normal to the main scanning direction. The radiation image read-out apparatus still further comprises photoelectric read-out means for photoelectrically detecting the light, which is emitted by the stimulable phosphor sheet when the stimulable phosphor sheet is exposed to the stimulating rays. In the radiation image read-out apparatus, in order for the image read out is to be begun, it is necessary for a leading end of the stimulable phosphor sheet with respect to the sub-scanning direction to be detected. As illustrated in FIG. 4A, the leading end of the stimulable phosphor sheet is detected by leading end detecting means containing a photodetector, such as a photodiode (PD). Specifically, when the stimulable phosphor sheet is moved in the sub-scanning direction to the position (i.e., a main scanning line) which is being scanned with the stimulating rays in the main scanning direction (i.e., along the direction normal to the plane of the sheet of FIG. 4A), the leading end detecting means monitors the level of the stimulating rays, which are reflected from the conveyor belt and the stimulable phosphor sheet. When the leading end of the stimulable phosphor sheet arrives at the main scanning line, the stimulating rays are reflected by the stimulable phosphor sheet, and therefore the level of the reflected stimulating rays changes. The change of the level of the reflected stimulating rays is detected by the leading end detecting means. In accordance with the results of the detection of the change performed by the leading end detecting means, read-out start instructing means gives a read-out start instruction to the photoelectric read-out means in order to begin the photoelectric readout.

Figure 4B:
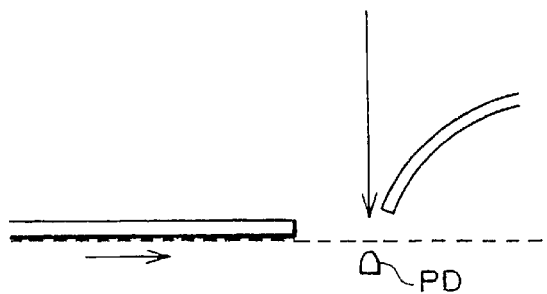
FIG. 4B is an explanatory view showing a different example of how part of image information stored at an overlapping area of the second stimulable phosphor sheet is lost in an image read-out operation in cases where image information having been recorded at an edge area of the second stimulable phosphor sheet cannot be read out perfectly.

However, the change of the level of the reflected stimulating rays occurs at the time at which the stimulable phosphor sheet has arrived at the main scanning line and the exposure of the stimulable phosphor sheet to the stimulating rays has begun. A series of processes (i.e., the detection of the change of the level of the reflected stimulating rays, the process for giving the read-out start instruction to the photoelectric read-out means, and the beginning of the image readout by the photoelectric read-out means) are performed after the exposure of the stimulable phosphor sheet to the stimulating rays has begun. Therefore, with the radiation image read-out apparatus, the image information recorded at the edge area cannot be read out from the stimulable phosphor sheet, on which the image information has been recorded over the entire sheet area including the edge area. The problems described above occurs also with a radiation image read-out apparatus wherein, as illustrated in FIG. 4B, a PD located on the main scanning line of the stimulating rays (but at a position that is not obstructed by the conveyor belt) detects the leading end of the stimulable phosphor sheet when the stimulating rays traveling toward the PD are interrupted by the stimulable phosphor sheet having arrived at the main scanning line.

As described above, in the image recording operation, the radiation image information is recorded also at the edge area of each of the first stimulable phosphor sheet 31 and the second stimulable phosphor sheet 32. However, the image information recorded at the edge area of each stimulable phosphor sheet cannot be read out, the first radiation image P1 indicated by the solid lines in FIG. 3A and the second radiation image P2 indicated by the solid lines in FIG. 3B are obtained from the image read-out operation.

In the embodiment of the radiation image processing apparatus in accordance with the present invention, in the manner described above, the first radiation image P1, in which the image information (indicated by the broken lines in FIG. 3A) recorded at the edge area of the first stimulable phosphor sheet 31 has been lost, is read out from the first stimulable phosphor sheet 31. Also, the second radiation image P2, in which the image information (indicated by the broken lines in FIG. 3B) recorded at the edge area of the second stimulable phosphor sheet 32 has been lost, is read out from the second stimulable phosphor sheet 32. The connection processing is then performed on a first radiation image signal S1, which represents the first radiation image P1, and a second radiation image signal S2, which represents the second radiation image P2, such that the radiation image P of the object is reconstructed from the first radiation image P1 and the second radiation image P2. The radiation image processing apparatus comprises overlapping region detecting means 14 for detecting an overlapping region of the first radiation image P1 (indicated by the solid lines in FIG. 3A), which overlapping region corresponds to the overlapping area of the first stimulable phosphor sheet 31 located on the side remote from the object, and an overlapping region of the second radiation image P2 (indicated by the solid lines in FIG. 3B), which overlapping region corresponds to the overlapping area of the second stimulable phosphor sheet 32. The radiation image processing apparatus also comprises correction processing means 15 for making an image density correction such that, for example, the image density of the overlapping region of the first radiation image P1 approximately coincides with the image density of the non-overlapping region of the first radiation image P1 other than the overlapping region. The radiation image processing apparatus further comprises connection processing means 16 for connecting the first radiation image P1, in which the image density of the overlapping region has been corrected, and the second radiation image P2 with each other such that the overlapping region of the first radiation image P1 and the overlapping region of the second radiation image P2 may overlap each other.

An example of how the overlapping region of the first radiation image P1 and the overlapping region of the second radiation image P2 are detected will be described hereinbelow.

Specifically, the overlapping area of the first stimulable phosphor sheet 31, upon which the overlapping area of the second stimulable phosphor sheet 32 overlaps, is exposed to a smaller dose of radiation than that delivered to the non-overlapping area of the first stimulable phosphor sheet 31. Therefore, as illustrated in FIG. 3A, in the first radiation image P1 having been read out from the first stimulable phosphor sheet 31, a boundary line image pattern 1c is formed due to a difference in image density between the overlapping region, which corresponds to the overlapping area of the first stimulable phosphor sheet 31, and the non-overlapping region, which corresponds to the non-overlapping area of the first stimulable phosphor sheet 31. The boundary line image pattern 1c is formed by an edge 32a (shown in FIG. 2) of the second stimulable phosphor sheet 32. Accordingly, if an edge 2a (shown in FIG. 3B) of the second radiation image P2 having been read out from the second stimulable phosphor sheet 32 is caused to coincide with the boundary line image pattern 1c, the overlapping region of the second radiation image P2 can be found. However, in the second radiation image P2, the image information recorded at the unreadable edge area having a certain length from the edge 32a of the second stimulable phosphor sheet 32 has been lost. Therefore, the second radiation image P2 having been read out from the second stimulable phosphor sheet 32 does not have the edge 2a (shown in FIG. 3B), which corresponds to the edge 32a of the second stimulable phosphor sheet 32. The second radiation image P2 has an edge 2a' at the position shifted by a predetermined distance m, which corresponds to the length of the unreadable edge area from the edge 32a of the second stimulable phosphor sheet 32, toward the center region of the second radiation image P2.

Therefore, the position of the edge 2a' of the second radiation image P2 may be caused to coincide with a position in the first radiation image P1, which position is shifted from the position of the boundary line image pattern 1c in the first radiation image P1 into the overlapping region of the first radiation image P1 by the predetermined distance m corresponding to the length of the unreadable edge area. The position of the first radiation image P1 and the position of the second radiation image P2 can thus be matched with each other. In this manner, the overlapping region of the first radiation image P1 and the overlapping region of the second radiation image P2 can be detected.

The predetermined distance m corresponding to the length of the unreadable edge area is of a value inherent to the radiation image read-out apparatus and can therefore be determined previously.

Besides the technique for utilizing the boundary line image pattern 1c, one of various other techniques may be employed for detecting the overlapping region. For example, position matching markers formed from a material having a low radiation transmittance may be located at the overlapping areas of the two adjacent stimulable phosphor sheets 31, 32, and the image recording operation may be performed in this state. The position matching may then be performed such that the positions of the marker image patterns appearing within the overlapping region of the first radiation image P1 and the positions of the marker image patterns appearing within the overlapping region of the second radiation image P2 may coincide with each other. In this manner, the overlapping region of the first radiation image P1 and the overlapping region of the second radiation image P2 can be detected.

The correction processing means 15 makes the image density correction such that the image density of the overlapping region of the first radiation image P1 approximately coincides with the image density of the non-overlapping region of the first radiation image P1 other than the overlapping region. Alternatively, the correction processing means 15 may correct the image density of the entire area of the overlapping region of the first radiation image P1 such that the image density of the area within the overlapping region of the first radiation image P1, which area corresponds to the readable area of the overlapping region of the second radiation image P2 (i.e., the readable area of the overlapping region other than the unreadable edge area extending from the edge 2a of the second radiation image P2 having been recorded on the second stimulable phosphor sheet 32 to the edge 2a' of the second radiation image P2 obtained from the image read-out operation), coincides with the image density of the readable area of the overlapping region of the second radiation image P2. Specifically, the image density correction may be made by adding a predetermined value to the image density value regardless of the gradation of the object image or by multiplying the image density value by a predetermined value regardless of the gradation of the object image.

In the connection processing performed by the connection processing means 16, as for the non-overlapping region of the first radiation image P1, image signal components of the first radiation image signal S1 representing the first radiation image P1, which image signal components correspond to the non-overlapping region of the first radiation image P1, are employed. As for the non-overlapping region of the second radiation image P2, the image signal components of the second radiation image signal S2 representing the second radiation image P2, which image signal components correspond to the non-overlapping region of the second radiation image P2, are employed. Also, as for the overlapping region of the first radiation image P1 and the overlapping region of the second radiation image P2, the image signal components of the second radiation image signal S2, which correspond to the overlapping region of the second radiation image P2, are employed. However, as described above, in the overlapping region of the second radiation image P2 having been obtained from the image read-out operation, the image information having been recorded at the unreadable edge area (extending from the edge 2a to the edge 2a') has been lost. Therefore, as for the lost area of the overlapping region of the second radiation image P2, which lost area corresponds to the unreadable edge area, the image signal components of the first radiation image signal S1 representing the first radiation image P1 having been obtained from the image density correction performed by the correction processing means 15, which image signal components correspond to the area within the overlapping region of the first radiation image P1 corresponding to the lost area of the overlapping region of the second radiation image P2, are employed.

The processings performed by the overlapping region detecting means 14, the correction processing means 15, and the connection processing means 16 are performed on the first (digital) radiation image signal S1 representing the first radiation image P1 and the second (digital) radiation image signal S2 representing the second radiation image P2. However, in this specification, as an aid in facilitating the explanation, the processings are often described as being performed on the radiation images and their regions and areas.

How this embodiment of the radiation image processing apparatus in accordance with the present invention operates will be described hereinbelow.

Firstly, as illustrated in FIG. 2, the radiation image P of the object is recorded on the first stimulable phosphor sheet 31 and the second stimulable phosphor sheet 32. The first radiation image P1 is read out from the first stimulable phosphor sheet 31, and the second radiation image P2 is read out from the second stimulable phosphor sheet 32. The two radiation image signals S1 and S2 representing the first radiation image P1 and the second radiation image P2 respectively are fed into the overlapping region detecting means 14.

In the manner described above, in accordance with the first radiation image signal S1 representing the first radiation image P1, the overlapping region detecting means 14 detects the boundary line image pattern 1c of the overlapping region of the first radiation image P1, the overlapping region corresponding to the overlapping area of the first stimulable phosphor sheet 31, which overlapping area overlaps the overlapping area of the second stimulable phosphor sheet 32. As illustrated in FIG. 3A, the overlapping region detecting means 14 then detects, as the overlapping region of the first radiation image P1, the region between the boundary line image pattern 1c in the first radiation image P1 and the edge (the lower edge) 1b of the first radiation image P1 on the side of the overlapping region. Also, as illustrated in FIG. 3B, in accordance with the second radiation image signal S2 representing the second radiation image P2, as the overlapping region of the second radiation image P2, the overlapping region detecting means 14 detects the region extending over the distance from the edge (the upper edge) 2a' of the second radiation image P2 on the side of the overlapping region, which distance is equal to the value of the difference between the distance from the boundary line image pattern 1c in the first radiation image P1 to the edge 1b of the first radiation image P1 on the side of the overlapping region and the length m of the unreadable edge area.

In the manner described above, the overlapping region of the first radiation image P1 and the overlapping region of the second radiation image P2 are detected by the overlapping region detecting means 14 in accordance with the first radiation image signal S1 and the second radiation image signal S2. The first radiation image signal S1 is then fed into the correction processing means 15. In the correction processing means 15, the image density of the overlapping region of the first radiation image P1, which overlapping region has been detected by the overlapping region detecting means 14, is corrected such that the image density of the overlapping region approximately coincides with the image density of the non-overlapping region of the first radiation image P1.

Thereafter, the first radiation image signal S1 representing the first radiation image P1, in which the image density of the overlapping region has been corrected, and the second radiation image signal S2 representing the second radiation image P2 are fed into the connection processing means 16. The connection processing means 16 performs the connection processing on the first radiation image signal S1 and the second radiation image signal S2 in accordance with their image signal components corresponding to the overlapping regions having been detected by the overlapping region detecting means 14. In the connection processing, as for the non-overlapping region of the first radiation image P1, the image signal components of the first radiation image signal S1 representing the first radiation image P1, which image signal components correspond to the non-overlapping region of the first radiation image P1, are employed. As for the non-overlapping region of the second radiation image P2, the image signal components of the second radiation image signal S2 representing the second radiation image P2, which image signal components correspond to the non-overlapping region of the second radiation image P2, are employed. As for the overlapping region of the first radiation image P1 and the overlapping region of the second radiation image P2, the image signal components of the first radiation image signal S1, which represents the first radiation image P1 having been obtained from the image density correction performed by the correction processing means 15, and the image signal components of the second radiation image signal S2 are employed selectively in the manner described below. Specifically, with respect to the lost area of the overlapping region of the second radiation image P2 (which lost area corresponds to the unreadable edge area extending from the edge 2a to the edge 2a'), the image signal components of the first radiation image signal Si representing the first radiation image P1 having been obtained from the image density correction performed by the correction processing means 15, which image signal components correspond to the area within the overlapping region of the first radiation image P1 corresponding to the lost area of the overlapping region of the second radiation image P2, are employed. Also, with respect to the remaining area other than the lost area of the overlapping region of the second radiation image P2, the image signal components of the second radiation image signal S2, which correspond to the remaining area of the overlapping region of the second radiation image P2, are employed.

Figure 5:
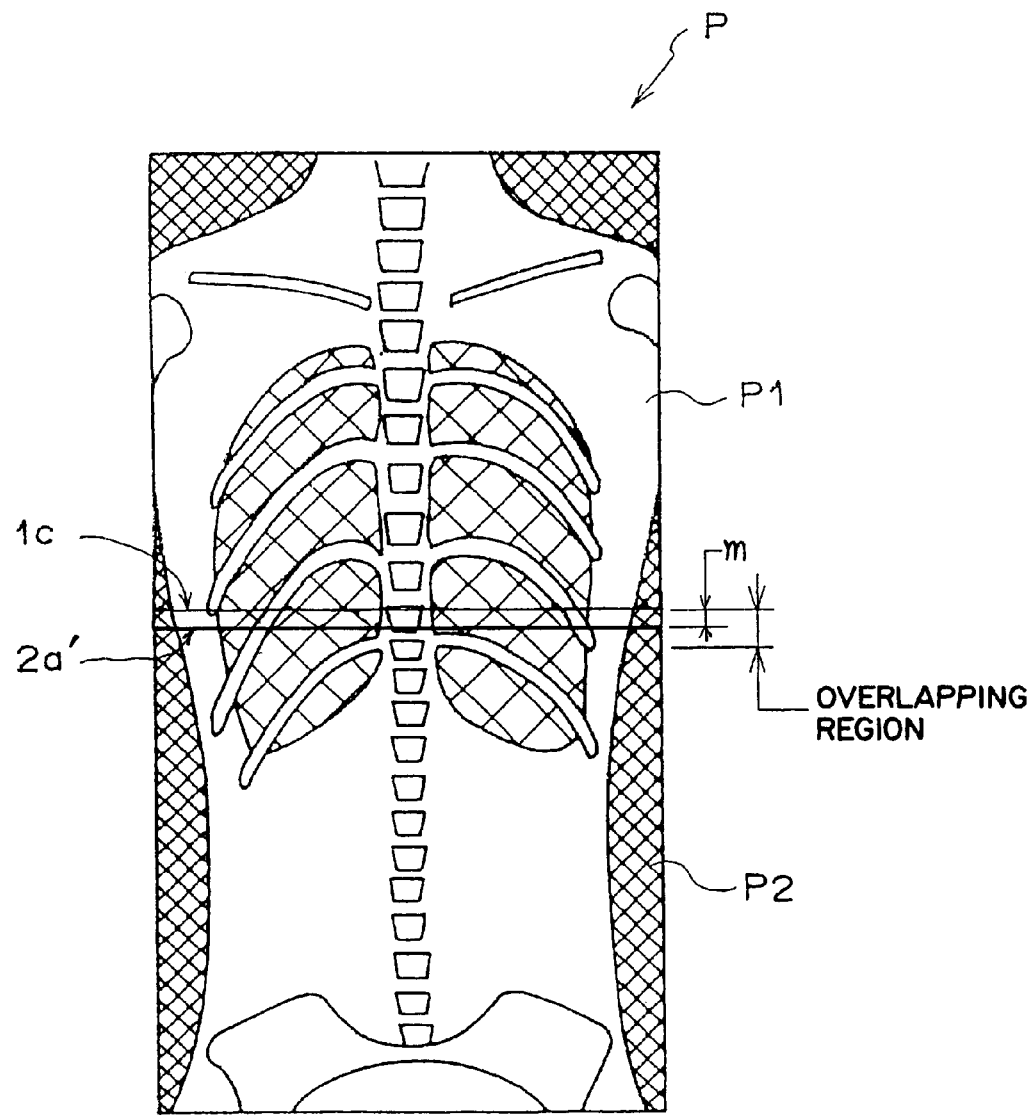
FIG. 5 is a schematic view showing a radiation image obtained from connection processing performed in the embodiment of FIG. 1.

In the manner described above, an image signal S is obtained from the connection processing performed on the first radiation image signal S1 and the second radiation image signal S2. FIG. 5 shows a reconstructed radiation image P represented by the thus obtained image signals. As illustrated in FIG. 5, in the reconstructed radiation image P, an area having a low image density, which adversely affects the image quality of the reconstructed radiation image and its capability of serving as an effective tool in, particularly, the efficient and accurate diagnosis of an illness, is not formed at part of the overlapping region.

As described above, with this embodiment of the radiation image processing apparatus in accordance with the present invention, the single radiation image P of the object is recorded on the two adjacent stimulable phosphor sheets 31 and 32 associated with each other such that their portions overlap each other, and the connection processing is performed on the radiation images P1 and P2 having been read out from the two adjacent stimulable phosphor sheets 31 and 32, such that the single radiation image P of the object is reconstructed from the radiation images P1 and P2. In the connection processing, even if the image information recorded at the edge area of each of the stimulable phosphor sheets 31 and 32 cannot be read out and is therefore lost in each of the radiation images P1 and P2 having been read out from the stimulable phosphor sheets 31 and 32, the problems can be prevented from occurring in that an area having a low image density, which adversely affects the image quality of the reconstructed radiation image and its capability of serving as an effective tool in, particularly, the efficient and accurate diagnosis of an illness, is formed at part of the overlapping region of the reconstructed radiation image P, which overlapping region corresponds to the overlapping areas of the two adjacent stimulable phosphor sheets 31 and 32.

As will be understood from FIG. 5 showing the reconstructed radiation image P, it often occurs that a slight difference in image density occurs at the boundary (corresponding to the boundary line image pattern 1c) between the overlapping region and the non-overlapping region of the first radiation image P1, and at the boundary (corresponding to the edge 2a' of the second radiation image P2) between the overlapping region of the first radiation image P1 and the second radiation image P2. The slight difference in image density may be perceived as a boundary line image pattern and may adversely affect the image quality of the reconstructed radiation image P. Therefore, the radiation image processing apparatus in accordance with the present invention may be provided with smoothing processing means for performing smoothing processing (such as median filtering processing) with respect to the area in the vicinity of the boundary between the overlapping region and the non-overlapping region of the first radiation image P1, and the area in the vicinity of the boundary between the overlapping region of the first radiation image P1 and the second radiation image P2. In this manner, the boundary line image patterns at the boundaries may be rendered imperceptible.

In the aforesaid embodiment of the radiation image processing apparatus in accordance with the present invention, before the connection processing is performed by the connection processing means 16, the image density correction is made with respect to the overlapping region of the first radiation image P1. However, the radiation image processing apparatus in accordance with the present invention is not limited to such processing. Alternatively, after the connection processing has been performed on the first radiation image P1 and the second radiation image P2, the image density correction may be made with respect to the area (i.e., the area extending over the distance m from the boundary line image pattern 1c toward the center region of the overlapping region) for which the image signal components of the first radiation image signal S1 representing the first radiation image P1 have been employed.

Also, in cases where the image density correction is made before the connection processing is performed, the entire area of the overlapping region of the first radiation image P1 need not necessarily be subjected to the image density correction. Specifically, of the overlapping region of the first radiation image P1, only the area to be employed for the overlapping region in the reconstructed radiation image P may be subjected to the image density correction.

As described above, the boundary line image pattern 1c appearing in the first radiation image P1 is formed at the boundary between the overlapping area of the first stimulable phosphor sheet 31, upon which the second stimulable phosphor sheet 32 overlaps, and the non-overlapping area of the first stimulable phosphor sheet 31. At the boundary between the overlapping area and the non-overlapping area of the first stimulable phosphor sheet 31, the incident radiation is diffracted or scattered slightly by the edge 32a of the second stimulable phosphor sheet 32. As a result, the sharpness of the boundary line image pattern 1c becomes low. For example, as illustrated in FIG. 6A, it often occurs that the image density changes over the range of ±n pixels around the boundary line image pattern 1c.

Figure 6A:
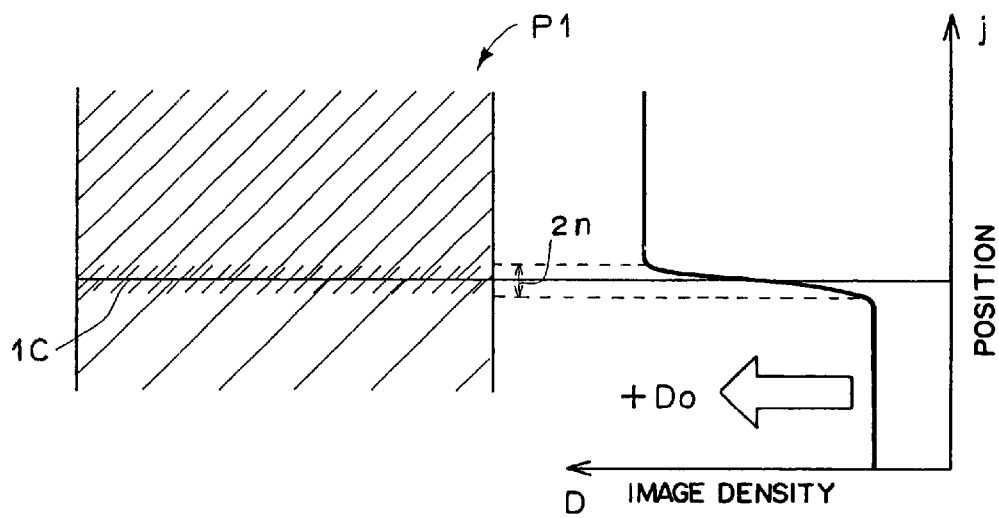
FIG. 6A is an explanatory view showing a distribution of image density at a boundary line image pattern-neighboring subarea of the first radiation image before an image density correction is made.
Figure 6B:
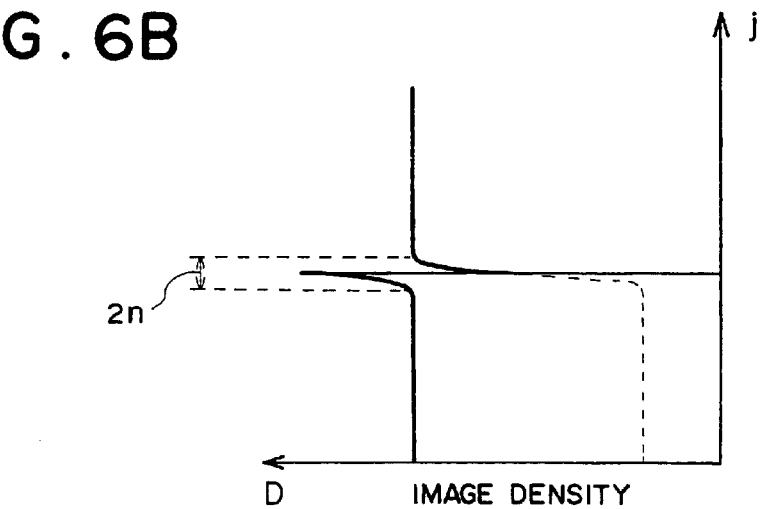
FIG. 6B is an explanatory view showing a distribution of image density at the boundary line image pattern-neighboring subarea of the first radiation image after the image density correction has been made.

In such cases, if the image density of the overlapping region having the boundary at the boundary line image pattern 1c is shifted uniformly (for example, by the addition of a predetermined value D0 as indicated by +D0 in FIG. 6A), the image density distribution as shown in FIG. 6B is obtained after the image density correction. Specifically, the image density of the subarea neighboring with the boundary line image pattern 1c becomes higher than the image density of the non-overlapping region. As a result, an artifact occurs at the subarea neighboring with the boundary line image pattern 1c and adversely affects the image quality of the reconstructed radiation image P and its capability of serving as an effective tool in, particularly, the efficient and accurate diagnosis of an illness.

Therefore, as the image density correction performed by the correction processing means 15 in the aforesaid embodiment of the radiation image processing apparatus in accordance with the present invention, different image density correcting processes should preferably be employed for (a) the subarea neighboring with the boundary line image pattern 1c, the subarea being part of the overlapping region of the first radiation image P1 to be subjected to the image density correction, and (b) the subarea other than the subarea neighboring with the boundary line image pattern 1c, the other subarea being part of the overlapping region of the first radiation image P1 to be subjected to the image density correction.

How the image density correcting processes are performed by the correction processing means 15 will be described hereinbelow. In the explanation below, by way of example, as the aforesaid range of ±n pixels, over which the image density changes around the boundary line image pattern 1c, the range of ±4 pixels is taken.

In this example, as the subarea neighboring with the boundary line image pattern 1c, the range of the width of the unsharp boundary line image pattern shown in FIG. 6A, i.e. the subarea Pa within the range of ±n pixels from the primary sharp boundary line image pattern 1c (or the uniquely detected boundary line image pattern 1c), is taken. Also, as illustrated in FIG. 7, as the subarea other than the subarea neighboring with the boundary line image pattern 1c, a subarea Pb excluding the subarea Pa neighboring with the boundary line image pattern 1c from the overlapping region (in the strict sense, the area within the overlapping region, which area is to be subjected to the image density correction, i.e. the area over the range of m pixels from the boundary line image pattern 1c) is taken.

In the correction processing means 15, an image density correcting process B is performed with respect to the subarea Pb other than the boundary line image pattern-neighboring subarea Pa. Also, an image density correcting process A, which is different from the image density correcting process B, is performed with respect to the boundary line image pattern-neighboring subarea Pa.

Figure 8:
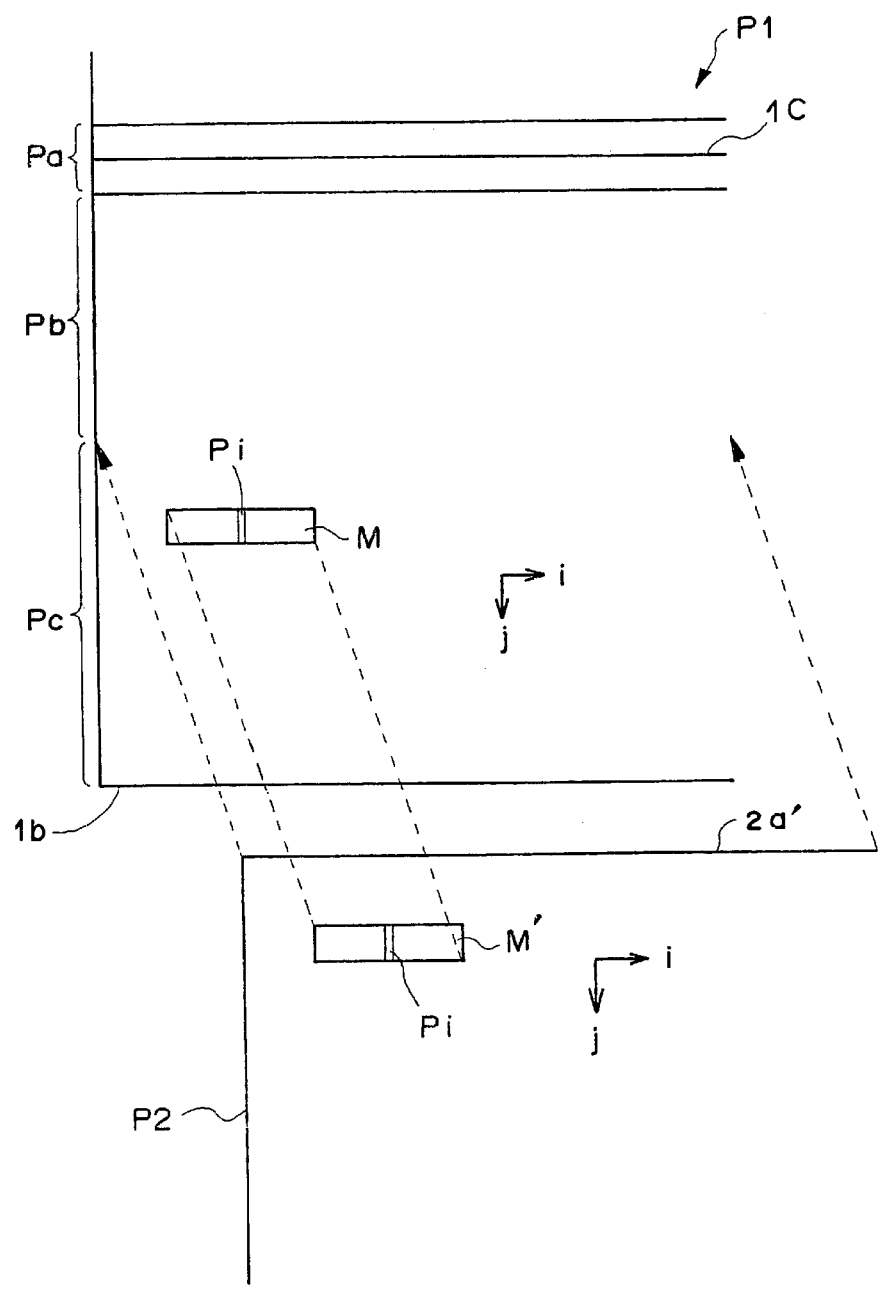
FIG. 8 is an explanatory view showing how an image density correcting process is performed with respect to the subarea other than the boundary line image pattern-neighboring subarea of the first radiation image.

The details of the image density correcting process B are approximately identical with the details of the image density correction performed by the correction processing means 15 in the embodiment described above. Specifically, in the image density correcting process B, as illustrated in FIG. 8, a template M having a size of, for example, 4 pixels (in the vertical direction, i.e. the column direction) ×21 pixels (in the horizontal direction, i.e. the row direction) is set at a certain position within an overlapping region Pc of the first radiation image P1, which overlapping region Pc corresponds to the overlapping region of the second radiation image P2. Also, a calculation is made to find a mean value Av(Pi) of the image density values (the image signal values) of 84 pixels within the template M. The image density mean value Av(Pi) is taken as a representative value of a center column Pi within the template M, which center column Pi is the center with respect to the row direction indicated by the arrow i. The template M is then shifted successively by a distance, which is equal to the length of a single pixel, in the row direction indicated by the arrow i, and calculations are made to find the representative values (the image density mean values) Av(Pi) of the center columns Pi with respect to the positions, to which the template M is shifted successively. Thereafter, a template M' having the same size as that of the template M is set at the position within the overlapping region of the second radiation image P2, which position corresponds to the aforesaid certain position of the template M within the overlapping region Pc of the first radiation image P1. Also, a calculation is made to find a mean value Av(Pi)' of the image density values (the image signal values) of 84 pixels within the template M' [Av(Pi)'>Av(Pi)]. The image density mean value Av(Pi)' is taken as a representative value of a center column Pi within the template M', which center column Pi is the center with respect to the row direction indicated by the arrow i. In the same manner as that for the template M, the template M' is then shifted successively by a distance, which is equal to the length of a single pixel, in the row direction indicated by the arrow i, and calculations are made to find the representative values (the image density mean values) Av(Pi)' of the center columns Pi with respect to the positions, to which the template M' is shifted successively. Thereafter, with respect to each of the center columns Pi with respect to the positions to which the template M and the template M' are shifted successively, a calculation is made to find a difference Su(Pi) between the representative value Av(Pi)' of the center column Pi in the second radiation image P2 and the representative value Av(Pi) of the corresponding center column Pi in the first radiation image P1 [Su(Pi)=Av(Pi)'−Av(Pi); the difference between the mean image density values of corresponding columns]. To the image density values of the pixels Pij, which are located in the subarea Pb other than the boundary line image pattern-neighboring subarea of the first radiation image P1, the image density difference Su(Pi) with respect to the corresponding column i is then added. In this manner, the image density correcting process B for the subarea Pb is performed. The image density difference Su(Pi), which is added to the image density values of the pixels Pij, which are located in the subarea Pb, may take different values for different positions with respect to the row direction indicated by the arrow i. However, as for the pixels located along a single column i, the image density difference Su(Pi), which is added to the image density values of the pixels Pij, which are located in the subarea Pb, takes an identical value for all of pixels Pi(j−1), Pij, Pi(j+1), . . . , which are located at different positions with respect to the column direction indicated by the arrow j.

Figure 9A:
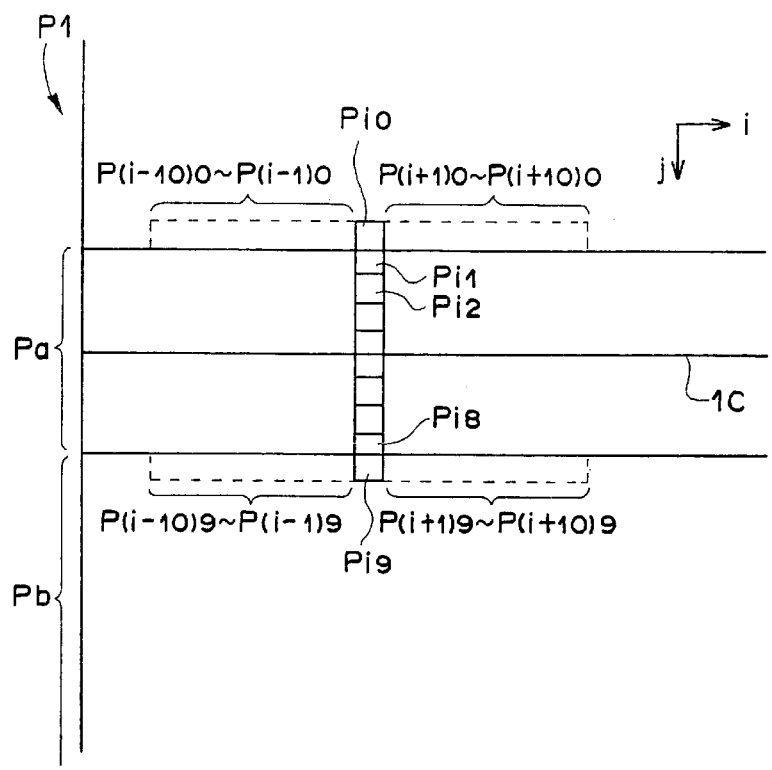
FIGS. 9A and 9B are explanatory views showing how an image density correcting process is performed with respect to the boundary line image pattern-neighboring subarea of the first radiation image.

How the image density correcting process A for the boundary line image pattern-neighboring subarea Pa is performed will be described hereinbelow with reference to FIGS. 9A and 9B. In this example, as illustrated in FIG. 9A, besides the neighboring subarea within the overlapping region of the first radiation image P1, the boundary line image pattern-neighboring subarea Pa also contains the neighboring subarea, which is located on the side (the upper side in FIG. 9A) of the boundary line image pattern 1c opposite to the overlapping region. However, this is one of preferable forms, and the boundary line image pattern-neighboring subarea Pa may not contain the neighboring subarea on the side opposite to the overlapping region.

With reference to FIG. 9A, the processing described below is performed with respect to ten pixels Pi0~Pi9, which are arrayed along the column direction indicated by the arrow j at the boundary line image pattern-neighboring subarea Pa. The ten pixels are set such that the boundary between the fifth pixel Pi4 and the sixth pixel Pi5, as counted from the upper side in FIG. 9A, coincides with the boundary line image pattern 1c.

In the image density correcting process A, firstly, for each of the rows (j=0, 1, . . . , 9), a calculation is made to find the mean value of the image density values of a total of 21 pixels, which have the center with respect to the direction indicated by the arrow i at the corresponding pixel among the ten pixels having been set in the manner described above, and which include ten pixels on the left side of the center pixel and ten pixels on the right side of the center pixel. Specifically, as for the pixel Pi0, a calculation is made to find a mean value Av(Pi0) of the image density values of a total of 21 pixels, which include ten pixels P(i−10)0, P(i−9)0, . . . , P(i−1)0 arrayed on the left side of the pixel Pi0, ten pixels P(i+1)0, P(i+2)0, . . . , P(i+10)0 arrayed on the right side of the pixel Pi0, and the center pixel Pi0. In the same manner as that described above, as for the pixel Pi1 on the next row, a calculation is made to find a mean value Av(Pi1) of the image density values of 21 pixels P(i−10)1~P(i+10)1. Thereafter, in the same manner as that described above, the image density mean values Av(Pij), wherein $0 \leq j \leq 9$, are calculated for the respective rows (by changing j).

Figure 9B:
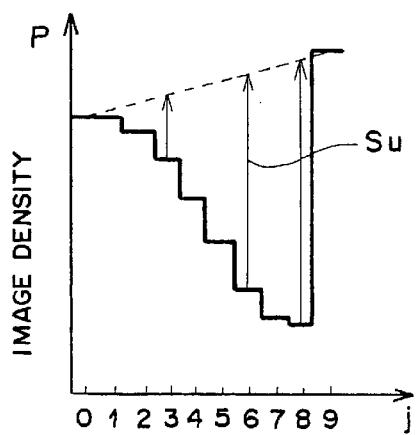

By way of example, the image density mean values Av(Pij) having been calculated for the respective rows have the distribution as shown in FIG. 9B. This is because, in the boundary line image pattern-neighboring subarea Pa, as described above, the image density changes little by little within the range of the width of ±4 pixels located on both sides (the upper and lower sides in FIG. 9A) of the boundary line image pattern 1c. In FIG. 9B, the image density mean value Av(Pi9) with respect to the bottom row in FIG. 9A takes a markedly large value. This is because the pixel Pi9 is the one belonging to the subarea Pb other than the boundary line image pattern-neighboring subarea and has therefore been subjected to the image density correcting process B.

Thereafter, by the utilization of the image density mean value Av(Pi0) with respect to the top row (j=0) and the image density mean value Av(Pi9) with respect to the bottom row (j=9), linear interpolating operations are performed to calculate interpolated image density values Av(Pi1)', Av(Pi2)', ..., Av(Pi8)' corresponding respectively to the rows (j=1, 2, ..., 8) intervening between the two and bottom rows. The calculations are made with the formula Av(Pij)'=Av(Pi0)+{Av(Pi9)−Av(Pi0)}j/9. AS indicated by the broken line in FIG. 9B, the interpolated image density values Av(Pij)' represent the interpolated image density values obtained such that, with respect to the direction indicated by the arrow j, the image density changes smoothly between the image density of the pixel Pi0 for the top row and the (corrected) image density of the pixel Pi9 for the bottom row. Thereafter, with respect to each row (each j), a difference Su(Pij) [=Av(Pij)'−Av(Pij)] between the interpolated image density value Av(Pij)' and the corresponding image density mean value AV(Pij) is calculated. The thus obtained difference Su(Pij) is added to the image density value Pij of the corresponding pixel Pij.

The operations described above may be represented by Formula (1) shown below.

$$Pij'=Pij+Su(Pij) \qquad (1)$$

in which Pij represents the image density value before being corrected, Pij' represents the image density value after being corrected, Su(Pij) represents the image density shift value. Su(Pij) is represented by the formula shown below.

$$Su(Pij)=Av(Pi0)+\{Av(Pi9)-Av(Pi0)\}j/9-Av(Pij)$$

The pixel of interest is shifted successively by one pixel along the direction indicated by the arrow i (i→i+1), and the operations described above are iterated. In this manner, the image density values of all pixels within the boundary line image pattern-neighboring subarea Pa and the subarea Pb, which are to be subjected to the image density correction, can be corrected.

In the manner described above, in the image density correction, the different image density correcting processes A and B are employed for the different image subareas. Therefore, formation of an artifact due to the image density correction can be restricted, and a connected image can be obtained which has good image quality and can serve as an effective tool in, particularly, the efficient and accurate diagnosis of an illness.

In the embodiments described above, the boundary line image pattern-neighboring subarea Pa contains part of the overlapping region of the first radiation image P1, which corresponds to the overlapping area of the first stimulable phosphor sheet 31, and part of the non-overlapping region of the first radiation image P1 more upward than the boundary line image pattern 1c, and the image density correction is made also for the part of the non-overlapping region of the first radiation image P1. However, in the connection processing method for radiation images and the radiation image processing apparatus in accordance with the present invention, the part of the non-overlapping region of the first radiation image P1 need not necessarily be subjected to the image density correction. For example, in the image density correcting process A described above, in cases where n=4, the processing may be performed with respect to only five pixels Pi1~Pi5. The five pixels may be set such that the pixel Pi1 on the top row may be located just above the boundary line image pattern 1c, and the pixel Pi2 on the next row may be located just under the boundary line image pattern 1c. Also, the linear interpolating operations may be performed between the image density value of the pixel Pi1 on the top row and the image density value of the pixel Pi5 on the bottom row. In this manner, the image density correcting process A may be performed with respect to only the part of the overlapping region neighboring with the boundary line image pattern 1c.

Also, in the embodiment described above, in the image density correcting process A, the image density correction is made by adding the difference Su(Pij) between the interpolated image density value Av(Pij)' and the corresponding mean value Av(Pij) of the image density values of the 21 pixels, which have the center at each pixel Pij and are arrayed along the direction indicated by the arrow i, to the image density value Pij of the pixel Pij. In such cases, in the manner described below, the difference Su(Pij) to be added for the correction should preferably be prevented from changing sharply with respect to the direction indicated by the arrow i. Specifically, the mean value Av(Pij) of the image density values of the 21 pixels, which have the center at each pixel Pij and are arrayed along the direction indicated by the arrow i, is smoothed as an arithmetic mean value with four image density mean values Av(P(i−2)j), Av(P(i−1)j), Av(P(i+1)j), and Av(P(i+2)j), which are obtained by successively shifting the pixel of interest Pij by one pixel in the horizontal direction. The arithmetic mean value is calculated with the formula shown below.

$$\{Av(P(i+2)j)+Av(P(i+1)j)+Av(Pij)+Av(P(i-1)j)+Av(P(i-2)j)\}/5$$

Alternatively, the difference Su(Pij) to be added for the correction may be smoothed as an arithmetic mean value with four difference values Su(P(i−2)j), Su(P(i−1)j), Su(P(i+1)j), and Su(P(i+2)j) to be added for the correction, which are obtained by successively shifting the pixel of interest Pij by one pixel in the horizontal direction. The arithmetic mean value is calculated with the formula shown below.

$$\{Su(P(i-2)j)+Su(P(i-1)j)+Su(Pij)+Su(P(i+1)j)+Su(P(i+2)j)\}/5$$

As another alternative, the number of the pixels for the addition for calculating the image density mean value Av(Pij) with respect to the pixel of interest may be altered from a total of 21 pixels (i.e., ten pixels on the left side of the center pixel Pij, ten pixels on the right side of the center pixel Pij, and the center pixel Pij) to a total of 31 pixels (i.e., 15 pixels on the left side of the center pixel Pij, 15 pixels on the right side of the center pixel Pij, and the center pixel Pij) or a total of 41 pixels (i.e., 20 pixels on the left side of the center pixel Pij, 20 pixels on the right side of the center pixel Pij, and the center pixel Pij). In this manner, the smoothing along the direction indicated by the arrow i may be performed.

Further, in the image density correcting process A in the embodiment described above, in cases where the boundary line image pattern 1c appears along an oblique direction other than the horizontal direction, the boundary between the boundary line image pattern-neighboring subarea Pa and the subarea Pb other than the boundary line image pattern-neighboring subarea may be set along the oblique direction which is parallel with the boundary line image pattern 1c. Also, the ten pixels arrayed along the vertical direction may be set such that, at every position with respect to the direction indicated by the arrow i, the boundary line image pattern 1c may intervene between the fifth pixel and the sixth pixel, as counted from the top pixel.

What is claimed is:

1. A connection processing method for radiation images, in which a single radiation image of an object is recorded on a plurality of stimulable phosphor sheets associated with one another such that portions of two adjacent stimulable phosphor sheets overlap each other, and in which connection processing is performed on a plurality of radiation images having been read out from the plurality of the stimulable phosphor sheets respectively, such that the single radiation image of the object is reconstructed from the plurality of the read-out radiation images, the method comprising the steps of:

i) as for at least a certain area within overlapping regions of two radiation images having been read out from the two adjacent stimulable phosphor sheets, which overlapping regions correspond to overlapping areas of the two adjacent stimulable phosphor sheets, employing an area within the overlapping region of a first radiation image having been read out from a first stimulable phosphor sheet located on the side remote from the object, which first stimulable phosphor sheet is one of the two adjacent stimulable phosphor sheets, and ii) making an image density correction such that an image density of the area within the overlapping region of the first radiation image, which area is employed as at least the certain area within the overlapping regions of the two radiation images having been read out from the two adjacent stimulable phosphor sheets, approximately coincides with the image density of a non-overlapping region of the first radiation image other than the overlapping region and/or the image density of a second radiation image having been read out from a second stimulable phosphor sheet, which is located on the side close to the object.

2. A method as defined in claim 1 wherein at least the certain area within the overlapping regions of the two radiation images having been read out from the two adjacent stimulable phosphor sheets is an area corresponding to an unreadable edge area of the second radiation image having been recorded on the second stimulable phosphor sheet.

3. A method as defined in claim 1 or 2 wherein different image density correcting processes are performed for (a) a boundary-neighboring subarea, which neighbors with a boundary between the overlapping region and the non-overlapping region of the first radiation image, the boundary-neighboring subarea being located in the area within the overlapping region of the first radiation image, which area is employed as at least the certain area within the overlapping regions of the two radiation images having been read out from the two adjacent stimulable phosphor sheets, and (b) the subarea other than the boundary-neighboring subarea, the other subarea being located in the area within the overlapping region of the first radiation image, which area is employed as at least the certain area within the overlapping regions of the two radiation images having been read out from the two adjacent stimulable phosphor sheets.

4. A method as defined in claim 3 wherein the image density correcting process for the subarea other than the boundary-neighboring subarea is performed by the addition of a predetermined image density shift value regardless of a distance from the boundary or by the multiplication of a predetermined image density shift factor regardless of the distance from the boundary, and the image density correcting process for the boundary-neighboring subarea is performed by the addition of image density shift values changing in accordance with the distance from the boundary or by the multiplication of image density shift factors changing in accordance with the distance from the boundary.

5. A method as defined in claim 1 or 2 wherein smoothing processing is performed with respect to the area, which has been subjected to the image density correction, and an area in the vicinity of the area, which has been subjected to the image density correction, in the radiation image after being reconstructed as the single radiation image.

6. A radiation image processing apparatus, in which a single radiation image of an object is recorded on a plurality of stimulable phosphor sheets associated with one another such that portions of two adjacent stimulable phosphor sheets overlap each other, and in which connection processing means is provided for performing connection processing on a plurality of radiation images having been read out from the plurality of the stimulable phosphor sheets respectively, such that the single radiation image of the object is reconstructed from the plurality of the read-out radiation images, wherein the connection processing means performs the connection processing such that, as for at least a certain area within overlapping regions of two radiation images having been read out from the two adjacent stimulable phosphor sheets, which overlapping regions correspond to overlapping areas of the two adjacent stimulable phosphor sheets, the connection processing means employs an area within the overlapping region of a first radiation image having been read out from a first stimulable phosphor sheet located on the side remote from the object, which first stimulable phosphor sheet is one of the two adjacent stimulable phosphor sheets, and the apparatus further comprises correction processing means for making an image density correction such that an image density of the area within the overlapping region of the first radiation image, which area is employed as at least the certain area within the overlapping regions of the two radiation images having been read out from the two adjacent stimulable phosphor sheets, approximately coincides with the image density of a non-overlapping region of the first radiation image other than the overlapping region and/or the image density of a second radiation image having been read out from a second stimulable phosphor sheet, which is located on the side close to the object.

7. An apparatus as defined in claim 6 wherein at least the certain area within the overlapping regions of the two radiation images having been read out from the two adjacent stimulable phosphor sheets is an area corresponding to an unreadable edge area of the second radiation image having been recorded on the second stimulable phosphor sheet.

8. An apparatus as defined in claim 6 or 7 wherein the correction processing means performs different image density correcting processes for (a) a boundary-neighboring subarea, which neighbors with a boundary between the overlapping region and the non-overlapping region of the first radiation image, the boundary-neighboring subarea being located in the area within the overlapping region of the first radiation image, which area is employed as at least the certain area within the overlapping regions of the two radiation images having been read out from the two adjacent stimulable phosphor sheets, and (b) the subarea other than the boundary-neighboring subarea, the other subarea being located in the area within the overlapping region of the first radiation image, which area is employed as at least the certain area within the overlapping regions of the two radiation images having been read out from the two adjacent stimulable phosphor sheets.

9. An apparatus as defined in claim 8 wherein the correction processing means performs the image density correcting process for the subarea other than the boundary-neighboring subarea by the addition of a predetermined image density shift value regardless of a distance from the boundary or by the multiplication of a predetermined image density shift factor regardless of the distance from the boundary, and performs the image density correcting process for the boundary-neighboring subarea by the addition of image density shift values changing in accordance with the distance from the boundary or by the multiplication of image density shift factors changing in accordance with the distance from the boundary.

10. An apparatus as defined in claim 6 or 7 further comprising smoothing processing means for performing smoothing processing with respect to the area, which has been subjected to the image density correction, and an area in the vicinity of the area, which has been subjected to the image density correction, in the radiation image after being reconstructed as the single radiation image.

* * * * *